Jan. 2, 1951   E. E. HOSEA   2,536,937
WORK SUPPORTING TABLE FOR MACHINE TOOLS
Filed April 3, 1947   2 Sheets-Sheet 1

INVENTOR
Everett E. Hosea
By Carlson, Pitzner, Hubbard & Wolfe
ATTORNEYS

Jan. 2, 1951  E. E. HOSEA  2,536,937
WORK SUPPORTING TABLE FOR MACHINE TOOLS
Filed April 3, 1947  2 Sheets-Sheet 2

INVENTOR
Everett E. Hosea
By Carlson, Pitzner, Hubbard & Wolfe
ATTORNEYS

Patented Jan. 2, 1951

2,536,937

UNITED STATES PATENT OFFICE 2,536,937

WORK SUPPORTING TABLE FOR MACHINE TOOLS

Everett E. Hosea, Kaukauna, Wis., assignor to Kaukauna Machine Corporation, Kaukauna, Wis., a corporation of Wisconsin Application April 3, 1947, Serial No. 739,196

6 Claims. (Cl. 90—58)

The invention relates generally to machine tools, and more particularly to table structures for supporting workpieces upon which machining operations are to be performed by such machines.

One object of the invention is to provide a machine tool work table characterized by its ability to handle workpieces which differ widely in size and shape, and capable of holding such workpieces in the position best suited for the machining operations to be performed.

Another object is to provide a structurally independent work supporting table of the indexing type which may be readily associated with different machine tools, and variously positioned with respect thereto in accordance with the requirements of the particular work involved.

It is also an object of the invention to provide a work supporting table having stationary and indexable work supporting sections adapted to be used together or independently, as required.

Other objects and advantages of the invention will become apparent from the following detailed description of the preferred embodiment illustrated in the accompanying drawings, in which.

Figure 1:
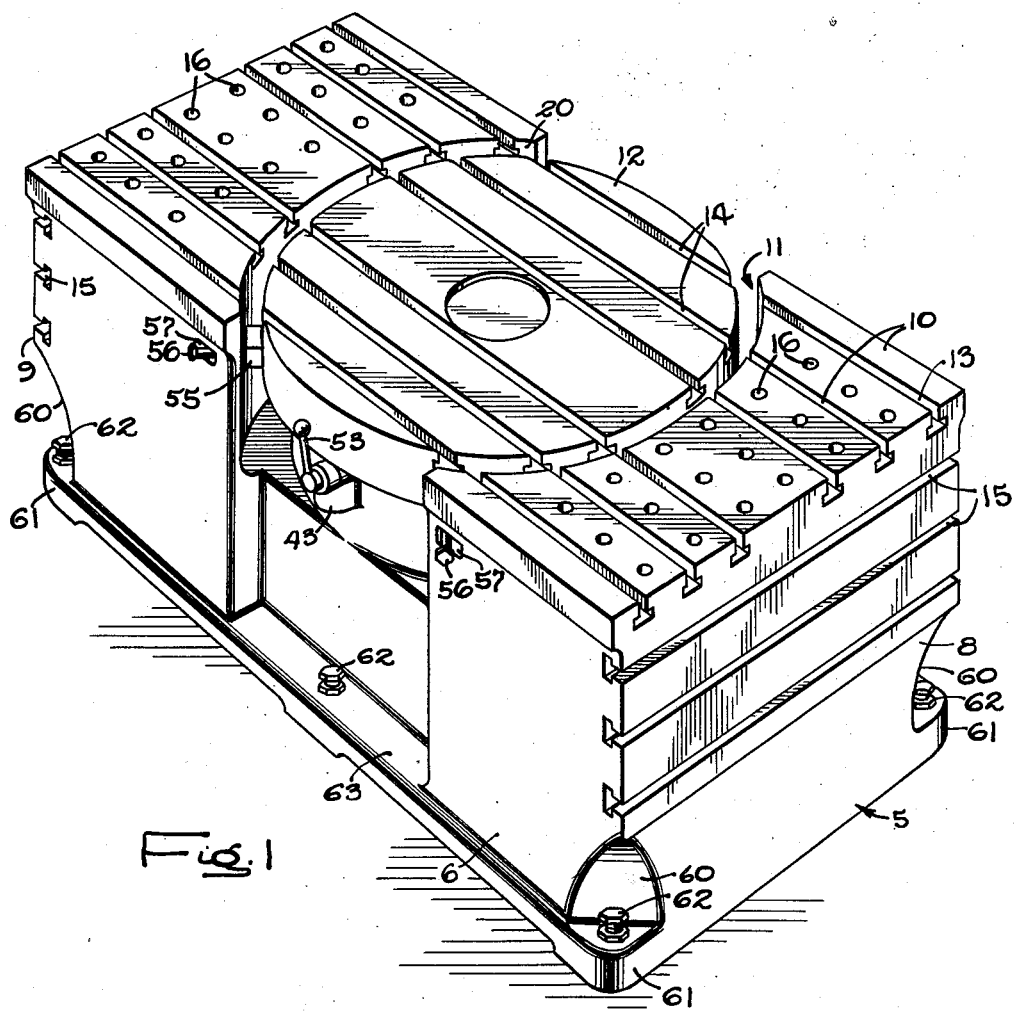
Figure 1 is a perspective view of a work supporting table embodying the features of the invention.

Referring to the drawings, the work supporting table comprises generally a rigid base or bed 5 adapted to be mounted adjacent a machine tool, as, for example, a floor type horizontal boring, drilling and milling machine (not shown). The bed 5 is preferably constructed as a well ribbed iron casting, and comprises upright front and back walls 6 and 7, end walls 8 and 9, and a horizontal top wall 10. As shown in Fig. 1, the top wall 10 of the bed is formed with a central recess 11 for the accommodation of a circular platen 12 supported for rotary indexing movements about a vertical axis.

In accordance with the invention, the platen 12 is arranged with its upper surface flush with the corresponding surface of the top wall 10 of the bed. The latter is smoothly finished and thus, together with the platen, provides a horizontal work supporting surface substantially coextensive with the bed 5 and capable of effectively supporting relatively large workpieces. Smaller workpieces may be supported on the stationary portion of the surface provided by the top wall 10 or on the rotatable platen 12 which may be indexed to present different sides of the workpiece for action by the tool of the machine with which the table structure is associated.

The utility of the improved table structure is further increased by finishing portions of the end walls 8 and 9 of the bed 5 to provide vertical work supporting surfaces at opposite ends of the bed. This enables the table to accommodate workpieces which cannot be supported conveniently on a horizontal surface and also workpieces which, because of their shape or for other reasons, require both horizontal and vertical supporting surfaces.

As will be seen by reference to Fig. 1 of the drawings, the various work supporting surfaces of the table are constructed to facilitate the clamping of the workpieces thereto. Thus, the two end sections of the top wall 10 are formed with parallel upwardly opening T-slots 13, in this instance extending longitudinally of the bed 5. The face of the platen 12 is likewise formed with parallel T-slots 14, preferably spaced apart similarly to the T-slots 13 so that they may be alined therewith when the platen is set in the position shown in Fig. 1. Parallel T-slots 15 in the end walls 8 and 9 are preferably disposed horizontally. The top 10 of the bed may also be formed with a series of holes 16 between the grooves 13 for the reception of dowell pins or the like by which conventional stops, positioning fixtures, etc. are adapted to be held in place on the table.

In the exemplary work supporting table, the recess 11 in the table top is formed with a diameter slightly greater than the width of the bed 5, thus leaving it open at the front and back and bordered at opposite ends by arcuate walls 20. The recess is closed at the bottom by a horizontal wall 21 reenforced by transverse upright webs 22 extending between the front and back walls 6 and 7 and by spaced upright webs 23 extending between the webs 22. Centrally of the recess, the horizontal wall 21 is formed with an upright generally cylindrical boss 24 reenforced by integrally formed gussets 25. A vertical bore in the boss 24 accommodates a stud 26 on which the platen 12 is mounted and adapted to rotate.

Figure 2:
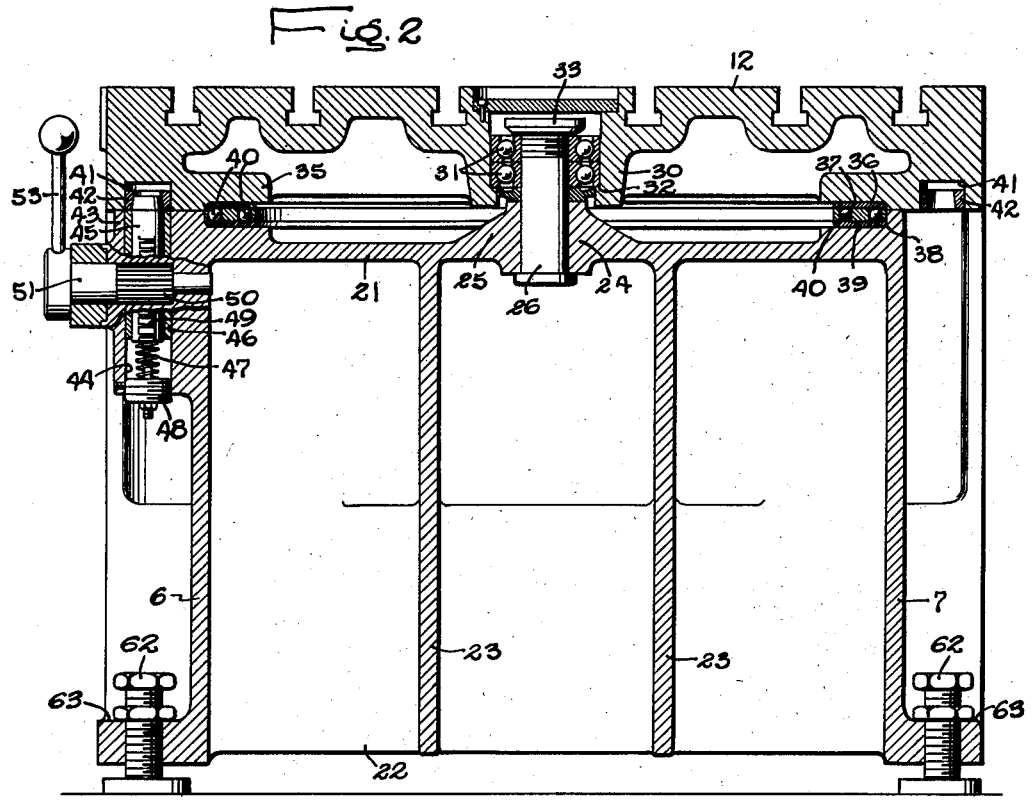
Fig. 2 is a transverse sectional view taken in a vertical plane substantially through the center of the table.

Referring now to Fig. 2 of the drawings, the platen 12 in its preferred form comprises a circular casting of a diameter corresponding approximately to the width of the table, suitably ribbed on its under side to provide strength and rigidity, and formed with a depending central tubular hub 30 adapted to receive the upper end of the stud 26. In the particular embodiment illustrated, the platen 12 is journaled on the stud 26 through the medium of radial and end thrust bearings 31 clamped between an inwardly projecting shoulder 32 formed in the lower end of the hub 30 and a nut 33 threaded on the stud 26.

The peripheral surface of the platen 12 is smoothly finished to provide a generally cylindrical frictional clamping surface, and its lower marginal edge portion is turned inwardly to form a relatively wide peripheral flange 35. The lower surface of the flange 35 is shaped for coaction with suitable anti-friction bearings provided for that purpose within an annular recess 36 in which is seated an annular bearing race 37 of hardened steel. The horizontal wall 21 of the bed is formed with a similar annular recess 38 for the accommodation of a hardened steel race ring 39. Roller elements, such as balls 40, interposed between the bearing race rings serve to support the weight of the platen 12 and the load carried thereby. In the particular table illustrated, the roller elements 40 comprise ball bearings and are preferably arranged in a plurality of concentric groups.

For accurately locating the platen 12 in selected indexed positions, a series of suitably spaced locating sockets 41 are provided on the platen. The sockets are arranged concentrically in series about the axis of the table in the outer portion of the flange 35 and are fitted with hardened steel bushings 42. The adjacent portion of the flange 35 is finished on the underside with a plane surface adapted to slide across the upper end of a cylindrical boss 43 integrally formed on the front wall 6 of the bed and having a bore 44 normal to the surface of the platen 12 for the accommodation of a hardened steel plunger 45 which is guided for axial movement in a bushing 46 fitted in the bore. A spring 47 interposed between the lower end of the plunger 45 and a screw plug 48 threaded into the lower end of the bore 44 urges the plunger upwardly so as to enter it into the locating sockets 41 when the table is turned to the corresponding indexed positions. The plunger thus accurately located the platen in its indexed position and effectually locks it in place.

Manually operable means is provided for retracting the plunger 45 to permit the platen to be indexed. For this purpose, the plunger 45 is formed with rack teeth 49 coacting with a pinion 50 rigid with or formed on a stub shaft 51 journaled in the boss 43 and extending transversely of the bore 44. At its outer end the shaft 51 is provided with a hand lever 53 by which it may be rotated to retract the plunger 46 against the action of the spring 47.

Figure 3:
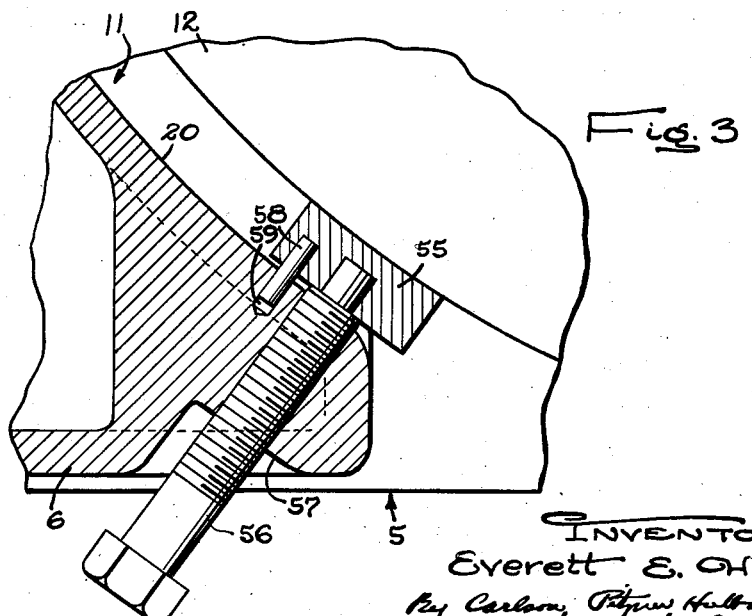
Fig. 3 is a fragmentary sectional view of the table showing the means for frictionally clamping the indexable section in set positions.

Provision is made for frictionally clamping the table in indexed positions to relieve the strain on the locating plunger 45 when the table structure is in use. For this purpose, a pair of arcuately faced shoes 55 (Figs. 1 and 3) are supported for engagement with the peripheral surface of the platen 12 on opposite sides of the plunger. As shown in Fig. 3, each shoe is supported on the inner end of a clamping screw 56 threaded into the front wall 6 of the bed. The wall is preferably recessed, as at 57, so that the clamping screw may be located radially of the platen. Dowel pin 58 carried by the shoe 55 and operating in a recess 59 in the arcuate wall 20 of the bed acts to prevent rotation of the shoe when the clamping screw is turned to shift the shoe into or out of clamping engagement with the platen.

In the exemplary table structure, the corner portions of the bed 5 are recessed as at 60 to provide outwardly projecting flanges 61 for the accommodation of leveling bolts 62 by which the table structure is anchored to the floor or bed plate upon which it is mounted. The front and rear walls of the bed are also recessed centrally to provide flanges 63 for the accommodation of additional hold-down bolts 62.

It will be apparent from the foregoing that the invention provides a work supporting table of novel and advantageous construction. The provision of a horizontal working surface, including stationary and indexable portions, renders the table universally adaptable for handling large workpieces and also workpieces upon which machining operations are to be performed on different sides. The provision of vertical work supporting surfaces at the ends of the bed enables the structure to accommodate workpieces which cannot be supported conveniently in a horizontal position and also angular workpieces which require support in two different planes. The improved table thus greatly facilitates the performance of machining operations by large floor-type machine tools.

I claim as my invention:

1. A work supporting table comprising, in combination, an elongated box-like bed having integral side, end and top walls, a circular platen, said top wall being recessed centrally to receive said platen with its upper surface flush with the top wall of the bed, said platen and said top wall being formed with upwardly opening T-slots for clamping workpieces thereto, longitudinal and transverse webs within said bed supporting a rigid bearing for said platen at the bottom of and centrally disposed within said recess, said bearing including an upright stud engaging in a bearing recess in said platen, an integral boss on one side wall of the bed disposed adjacent said recess with one end underlying said platen, said boss having a bore normal to the lower surface of the platen, a plunger in said bore, a plurality of downwardly opening locating sockets in the platen for receiving said plunger to locate the platen in successive indexed positions, spring means yieldably urging said plunger into the socket located in operative relation therewith, and manually operable means for retracting the plunger to release the platen for indexing movement.

2. A work supporting table comprising, in combination, an elongated box-like bed having integral side, end and top walls, a circular platen, said top wall being recessed centrally to receive said platen with its upper surface flush with the top wall of the bed, said platen and said top wall being formed with upwardly opening T-slots for clamping workpieces thereto, longitudinal and transverse webs within said bed supporting a rigid bearing for said platen at the bottom of and centrally disposed within said recess, said bearing including an upright stud engaging in a bearing recess in said platen, an integral boss on one side wall of the bed disposed adjacent said recess with one end underlying said platen, said boss having a bore normal to the lower surface of the platen, a plunger in said bore, a plurality of downwardly opening locating sockets in the platen for receiving said plunger to locate the platen in successive indexed positions, means for shifting said plunger into and out of engagement with the sockets, means for rigidly clamping said platen in set positions including a pair of arcuate shoes frictionally engaging the peripheral surface of the platen, and adjusting screws for said shoes threaded in the side wall of said bed on opposite sides of said recess.

3. A work supporting table comprising, in combination, an elongated box-like bed having integral side, end and top walls, a circular platen of a diameter corresponding to the width of the bed, said top wall having a central recess dividing it into two separate sections spaced apart to receive the platen therebetween, the side walls of said bed being open adjacent said recess to provide convenient access to the platen, means supporting said platen with its upper surface flush with the surfaces of said top wall sections and for rotation about an axis perpendicular to such surfaces, said top wall sections and said platen being smoothly finished to provide a horizontal work supporting surface substantially coextensive with the horizontal section of the bed, and frictional clamping shoes supported on said bed at opposite sides of the opening in said front wall engageable with the peripheral surface of said platen to clamp the same rigidly in set positions.

4. A work supporting table comprising, in combination, an elongated box-like bed having integral side, end and top walls, a circular platen, said top wall and said side walls being recessed centrally to receive said platen with its upper surface flush with the top wall of the bed, said platen, said top wall and the ends walls of said bed being finished to provide flat work supporting surfaces and having T-slots formed therein for clamping workpieces thereon, and supporting flanges formed on said side and end walls adjacent their lower edges, said flanges being apertured for the reception of hold down bolts and said walls being recessed adjacent the flanges to provide clearance for the bolts.

5. A work supporting table comprising, in combination, an elongated generally rectangular bed having a horizontal work supporting surface on its upper side with a central recess formed therein, a horizontal wall defining the bottom of said recess, a cylindrical stud projecting upwardly from said wall and substantially centered in said recess, a circular platen journaled on said stud with its upper surface flush with the work supporting surface of the bed, a circular bearing track formed in the lower face of said platen, a correspondingly dimensioned circular bearing track formed on the upper face of said wall, and anti-friction bearings interposed between said bearing tracks, including a pair of hardened steel rings and roller elements arranged in a plurality of concentric rows and disposed between said rings to complete the bearing relationship.

6. A work supporting table comprising, in combination, a generally rectangular bed having a horizontally disposed top with a central recess therein, a circular platen supported in said recess for rotation about a vertical axis, said platen having its upper surface disposed flush with the upper surfaces of said top to provide a plane horizontal work supporting surface coextensive with the top of said bed, and upright walls at opposite ends of said bed providing plane vertical work supporting surfaces, said top, said upright walls and said platen being formed with T-slots for clamping workpieces thereto.

EVERETT E. HOSEA.

REFERENCES CITED

The following references are of record in the file of this patent:

UNITED STATES PATENTS

| Number | Name | Date |
| --- | --- | --- |
| 162,841 | Mayer | May 4, 1875 |
| 1,956,883 | Vanderber | May 1, 1934 |
| 2,114,911 | Burt | Apr. 19, 1938 |
| 2,363,383 | Bertoldo et al. | Nov. 21, 1944 |